United States Patent Office 3,302,683
Patented Feb. 7, 1967

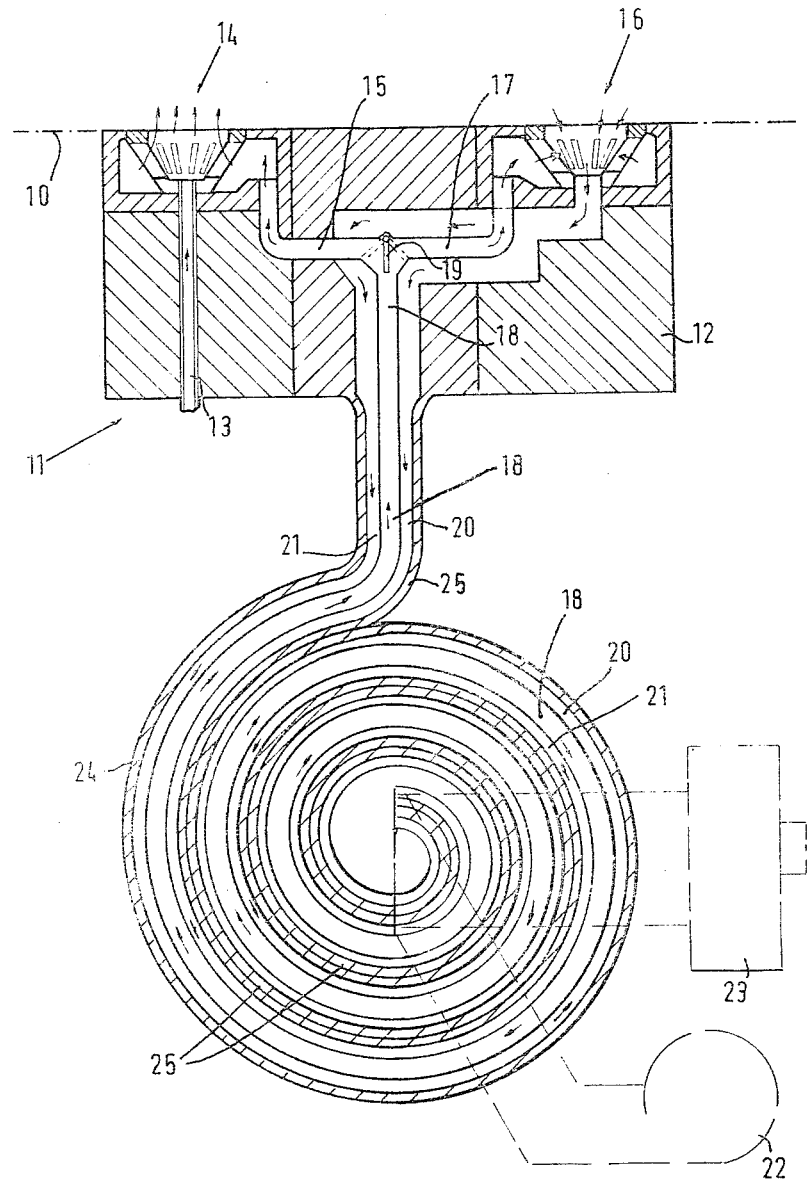

3,302,683
HEAT TREATMENT APPARATUS
William George Kemp, Handsworth Wood, Birmingham, England, assignor to Wellman Incandescent Furnace Company Limited, Smethwick, England, a British company
Filed Apr. 7, 1965, Ser. No. 446,160
Claims priority, application Great Britain, Apr. 16, 1964, 15,741/64
1 Claim. (Cl. 153—4.5)

This invention relates to heat-treatment apparatus designed to produce and maintain a system of combustion which under heavily reducing or non-scaling gas composition will continuously produce an economically useful exothermic effect at elevated and medium temperatures and delivery of heat from this protective atmosphere to the work load to a degree unattainable by conventional methods of combustion.

In accordance with the invention, heat-treatment apparatus includes at least one fuel burner provided with a combustion air feed via a heat exchanger, an exhaust from the furnace via the same heat exchanger, and control means effective to vary the amount of air flowing to the furnace and also (via the same or another control means) to control a supply of air to the exhaust passage of the heat exchanger.

In a practical embodiment of the invention the following design considerations are utilised:

(1) The delivery of combustion gas or fuel (e.g., coal-gas or a hydrocarbon fuel) into a conical refractory burner setting provided with a series of air ports within the cone through which preheated combustion air (from the heat exchanger) at a temperature of not less than 1000° C. and preferably 1100° C. is delivered into and mixes integrally with the fuel gas stream.

(2) Preheating the combustion air by means of contraflow passage through a slot or sandwich type recuperator or heat exchanger typically of oval, spiral, square, or rectangular form in which the air passage is located in the centre of and between two contraflow passages carrying exhaust (and for this purpose heating) gases flowing in a reverse direction. The outer surface of each of the contraflow heating gas passages is insulated so that a cross-section through the contraflow recuperator element is as follows: insulation, heating gas passage, combustion air passage, heating gas passage, insulation. Thus, for the sake of compactness, this contraflow recuperator element, which may be of considerable length, is arranged in oval-ised, spiral or rectangular form. The outer or insulating layers of each part of the element prevent heat drain into or temperature equalisation between the earlier and the later parts of the flow circuit, which may be folded upon each other or otherwise brought into contact by the process of folding or forming to provide a compact unit. By this means, minimum temperature differential is obtained between the hot gas intake (exhaust from the working chamber of the apparatus) and the hot air discharge (into the working chamber), due to the particular construction of this long triple passage contraflow element being insulated and isolated from adjacent sections in the folded form.

(3) Controlled contraflow of air and heating gas through the recuperator is by means of pressure and exhaust blowers connected respectively to the cold air intake and the cooled heating gas discharge port.

(4) The extraction of heating gases from the furnace or chamber to which the burner (para. 1) is applied is by direct connection of an exhaust port within the furnace to the heating gas slots of the sandwich recuperator by means of suitable heat conduit, within which and running contraflow to the heating gas is contained a heat resisting conduit through which the air heated in contraflow to the heating gases is discharged from the sandwich slot recuperator and connected to the refractory cone burner (para. 1).

(5) The heated air discharged from the recuperator is divided into two streams, one stream leading to the refractory conical burner and the other to the refractory extraction cone through which reducing gas is withdrawn from the furnace. The conjunction and mixing of the preheated air with the reducing heating gases within the refractory extraction cone enables completion of the combustion of these gases, converting the latent or chemical heat of the same into sensible heat and thus elevating the temperature of the same. Such heat is then available by passage through the centre of the slot sandwich recuperator.

(6) The division and proportional flow of preheated air from the slot recuperator is controlled in the required proportion or ratio of air to fuel gas to maintain the correct $CO/CO_2$ ratio according to the operating temperature and quality of the material being heated in the resultant atmosphere within the furnace. The balance of the preheated air is channeled to the refractory extraction cone within the furnace exhaust port to mix with and complete the combustion of the reducing gases extracted from the furnace prior to the passage of these gases through the two outer slots of the contraflow sandwich recuperator, thereby enabling a reducing atmosphere to be maintained by the actual burning fuel but utilising the whole of the calorific value of the fuel for the work heating.

(7) During the period of preheat or temperature build-up of the furnace the gas/air ratio or proportioning is such as will effect complete combustion within the working chamber of the furnace and during the period of preheat or temperature build-up the heat content of gases extracted from the furnace is entirely in the sensible form and such gases pass through the slot recuperator without air addition and 100% of the air preheated and discharged from the slot recuperator flows through the refractory conical burner port to effect complete combustion of the fuel gas.

(8) During ordinary conditions of working of the furnace, in which the atmosphere is maintained under heavily reducing conditions only a proportion of the atmosphere i.e. less than 50% of the total volume, is extracted for air preheat in the contraflow sandwich slot recuperator, the balance of this gas or furnace atmosphere flowing to a work or load preheating chamber, or in a continuous furnace (e.g. a rotary furnace) in a direction contraflow to the incoming work load, and both preheats and protects the work load. As however protection of the work load is not necessary below certain critical limits and lower temperatures, it is economical to complete the combustion of the furnace atmosphere or reducing gas progressively in the preheating section, thus making available additional heat during the lower temperature phase of the load preheat. Thus, under these conditions of preheat the same system of extraction recuperation could be used to extract heat from gases exhausted from the preheating section, with the exception that no combustion or fuel gas is supplied to the conical refractory burner in the preheating section. Thus the supply of only preheated air to this burner, which air is injected into the aforesaid reducing atmosphere in the preheating section, causes or effects the complete combustion of this reducing atmosphere within the preheating section and the delivery of heat evolved to preheat the work load by radiation or convection or both.

The advantages of the invention are that the apparatus makes possible the continuous and simultaneous conjunction of highly preheated air with combustion gas in such proportions, at such temperature and in such state as will maintain the correct $CO/CO_2$ ratio under heavily reducing but strongly exothermic conditions: the extraction and complete combustion of such gas from which sensible heat is transferred and fully utilised can be realised by means of the insulated sandwich type contraflow recuperator in which and through which combustion air is preheated to temperature exceeding 1000° C.; control of the apparatus is relatively simple due to the emergent stream of preheated air being divided into two automatically controlled proportions or streams, one stream directed to the refractory fuel gas conical burner and the other stream to the refractory conical extraction port within the furnace; the apparatus is versatile and can be used for the extraction of reducing atmosphere from any conditioned furnace atmosphere system, preheating air by the complete combustion of and the utilisation of this reducing atmosphere; the completion of combustion of this reducing atmosphere within the furnace at any point or position desired, enabling predetermined conditions in the furnace to be achieved with ease, such as in load preheat sections by the injection of the preheated air into the furnace reducing atmosphere in the appropriate sections of the furnace without fuel addition.

The invention is more particularly described by way of example and with reference to the accompanying drawing wherein the sole figure is somewhat diagrammatic sectional elevation showing a heat exchanger and furnace burner assembly.

Referring now to the drawing, the furnace indicated by the chain dot line 10 is provided with a number of burner assemblies indicated generally by the reference 11, and which comprise a refractory e.g. ceramic block body 12 provided with a combustible fuel gas passage 13 leading to a refractory burner cone 14.

The fuel gas emerges into the furnace interior via the cone 14 and is mixed intimately with a stream of combustion air entering the cone area via supply passage 15.

The block body 12 also comprises an extraction cone 16 in which furnace gases are extracted and may be mixed with air via supply passage 17 whereby combustion may be completed as the mixture flows in the direction indicated by the arrows.

The air supply passages 15, 17, are connected together and to an air flow passage 18, and a flap valve 19 is located at the junction to control and proportion the flows according to whether the full flow is to enter passage 15 as may be required in furnace preheating and/or in cooling when the fuel supply is cut off, or to enter passage 17 only as may be required in other circumstances, or some division of the supply is required. The flap valve is only one example of mechanism which may be used for this function and is controllable from externally of the furnace.

The passage 18 is sandwiched between two passages 20, 21 which are exhaust flow passages and which convey the exhaust from the cone 16. The sandwich of the three passages extends spirally to a central zone at which the air passage 18 is connected to a blower 22 and the exhaust passages 20, 21 are connected to a suction or extractor fan 23. The insulation separating the passages 20 and 21 from the adjacent portions of the same, is indicated by the references 24, 25.

I claim:

A heat treatment furnace comprising a burner opening leading into the furnace, a duct for supplying fuel to the burner opening, an exhaust opening for extraction of gases from the furnace, a heat exchanger having an exhaust gas passage connected to receive furnace gases from the exhaust opening, and having an air supply passage arranged to conduct combustion air in contraflow heat exchange relationship with the exhaust gas passage, a first hot air duct for conducting preheated air from such air supply passage to the burner opening, a second hot air duct for conducting preheated air from such air supply passage to the exhaust opening, and an air flow control for determining the distribution of the preheated air between the two hot air ducts, in order to supply the preheated air to the burner opening for complete combustion of the fuel during warm up of the furnace, and during normal operation of the furnace to supply part of the preheated air to the burner opening for producing a reducing atmosphere in the furnace while supplying the remainder of the preheated air to the exhaust opening to complete the combustion of the furnace gases entering the exhaust gas passage, the heat exchanger being adapted to preheat the air to at least 1000° C. during normal operation of the furnace.

References Cited by the Examiner

UNITED STATES PATENTS

| 1,569,499 | 1/1926 | Kagi | 165—156 |
| 2,136,813 | 11/1938 | Dolison | 165—156 X |
| 2,255,540 | 9/1941 | Dreffein | 126—91 |
| 3,146,821 | 9/1964 | Wuetig | 158—1 |
| 3,163,202 | 12/1964 | Schmidt et al. | 158—7.5 |

FREDERICK L. MATTESON, JR., *Primary Examiner.*

E. G. FAVORS, *Assistant Examiner.*